(12) United States Patent
Hwang

(10) Patent No.: US 11,689,595 B1
(45) Date of Patent: Jun. 27, 2023

(54) METHOD AND SYSTEM FOR MONITORING STREAMING

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 17/828,494

(22) Filed: May 31, 2022

(30) Foreign Application Priority Data

Apr. 14, 2022 (KR) ........................ 10-2022-0046153

(51) Int. Cl.
*G06F 15/16* (2006.01)
*H04L 65/611* (2022.01)
*H04L 65/80* (2022.01)

(52) U.S. Cl.
CPC ............ *H04L 65/611* (2022.05); *H04L 65/80* (2013.01)

(58) Field of Classification Search
CPC ................................. H04L 65/611; H04L 65/80
See application file for complete search history.

(56) References Cited

U.S. PATENT DOCUMENTS

| | | | | | |
|---|---|---|---|---|---|
| 7,302,481 | B1 * | 11/2007 | Wilson | ................... | H04L 69/163 709/224 |
| 7,620,716 | B2 * | 11/2009 | Pirzada | ............... | H04N 21/6473 709/224 |
| 10,983,889 | B2 * | 4/2021 | Erickson | ................ | G06F 11/302 |
| 2012/0303797 | A1 * | 11/2012 | Mathur | ................. | H04L 67/535 709/224 |
| 2013/0107741 | A1 * | 5/2013 | Huang | .................... | H04L 43/00 370/252 |
| 2015/0189394 | A1 * | 7/2015 | French | ............... | H04N 21/4381 725/109 |
| 2015/0237409 | A1 * | 8/2015 | Harper | ............... | H04N 21/6543 725/19 |
| 2016/0191591 | A1 * | 6/2016 | Rider | .................... | H04L 65/762 709/219 |
| 2016/0380857 | A1 * | 12/2016 | Wang | .................. | H04L 12/1863 398/25 |
| 2020/0067952 | A1 * | 2/2020 | Deaguero | ................ | H04L 43/16 |
| 2020/0279567 | A1 * | 9/2020 | Adlersberg | ............. | G06F 40/35 |
| 2020/0372131 | A1 * | 11/2020 | Wise | ..................... | H04L 65/764 |
| 2022/0014806 | A1 * | 1/2022 | Fretwell | ............... | H04N 21/442 |

FOREIGN PATENT DOCUMENTS

KR 10-2009-0040107 4/2009

* cited by examiner

*Primary Examiner* — Oleg Survillo
(74) *Attorney, Agent, or Firm* — Nixon Peabody LLP

(57) ABSTRACT

Disclosed are a method and system for monitoring streaming. The method for streaming monitoring includes registering a streaming channel of a user as monitoring target information, performing monitoring on broadcast streaming using the streaming channel based on configuration information of the user, and providing monitoring information for the broadcast streaming.

17 Claims, 7 Drawing Sheets

FIG. 5

Streaming protocol-related information

Traditional Video Streaming Protocols
- RTMP (Real-Time Messaging Protocol)
- RTSP (Real-Time Streaming Protocol)/RTP (Real-Time Transport Protocol)

HTTP-Based Adaptive Protocols
- Apple HLS (HTTP Live Streaming)
- Low-Latency HLS
- MPEG-DASH (Moving Picture Expert Group Dynamic Adaptive Streaming over HTTP)
- Low-Latency CMAF for DASH (Common Media Application Format for DASH)
- Microsoft Smooth Streaming
- Adobe HDS (HTTP Dynamic Streaming)

Other Technologies
- SRT (Secure Reliable Transport)
- WebRTC (Web Real-Time Communications)

METHOD AND SYSTEM FOR MONITORING STREAMING

CROSS-REFERENCE TO RELATED APPLICATION

This application is based on and claims priority under 35 U.S.C. 119 to Korean Patent Application No. 10-2022-0046153, filed Apr. 14, 2022, in the Korean intellectual property office, the disclosure of which is hereby incorporated by reference in its entirety.

TECHNICAL FIELD

The following description relates to a technology for monitoring broadcast streaming.

BACKGROUND OF THE DISCLOSURE

Recently, user's satisfaction is increased due to an increase in the Internet speed, that is, a transmission bandwidth. Due to the rapid development of such an Internet-related technology, an Internet service is possible in which multimedia content in which live audio and video are combined can be watched and heard through online search.

A streaming service, that is, one of the internet services, is a method of dividing audio data or video data having a large size into several files and continuously transmitting the files in real time without downloading all the audio data or video data and executing the audio data or video data in executing the audio data or video data.

For example, Korean Patent Application Publication No. 10-2009-0040107 (laid open on Apr. 23, 2009) discloses a technology for providing a personal broadcast in real time through a streaming service.

A broadcast operator increases a degree of image quality satisfaction of customers by applying a method of monitoring a high picture quality image transmitted by a broadcast transmission stage and generating or transmitting video content based on the results of the monitoring.

However, the distortion of an image (e.g., a defect in an original image or distortion occurring in an encoding process) may occur when the broadcast transmission stage transmits a high picture quality image, or an image may be distorted for various reasons while the image is transmitted to a set-top box via a local station. For example, due to network performance deterioration, the distortion of an image attributable to a packet loss, delay, or modification may occur.

In general, it is difficult to be aware of the occurrence of distortion in a playback image of the set-top box, which is represent in TV of a viewer, based on the monitoring of an image signal by the broadcast transmission stage until a customer reports the occurrence of the distortion. Furthermore, although the occurrence of distortion is aware based on a customer report, there is a problem in that it is difficult to find out a cause of the occurrence based on a check after timing at which the distortion occurred.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment provides a function for monitoring a streaming state in a broadcast situation and confirming whether a streaming broadcast is received normally.

In an embodiments, a method performed by a computer device includes registering, by at least one processor included in the computer device, a streaming channel of a user as monitoring target information, performing, by the at least one processor, monitoring on broadcast streaming using the streaming channel based on configuration information of the user, and providing, by the at least one processor, monitoring information for the broadcast streaming.

According to an aspect, the method may further include providing a streaming monitoring service in a service environment of a corresponding platform operator through an application program interface (API) operating in conjunction with a platform providing the streaming channel.

According to another an aspect, registering the streaming channel of the user may include registering the monitoring target information including streaming platform information, a streaming address, a streaming format, and streaming access authentication information.

According to still another aspect, performing the monitoring may include setting a monitoring method for at least one of video content and audio content included in the broadcast streaming.

According to still another aspect, performing the monitoring may include setting at least one of a monitoring cycle, monitoring area, and monitoring bit rate of the broadcast streaming.

According to still another aspect, performing the monitoring may include receiving the broadcast streaming for which monitoring has been requested by the user through the streaming channel, and analyzing streaming quality based on a reception bit rate of the broadcast streaming.

According to still another aspect, performing the monitoring may include receiving the broadcast streaming for which monitoring has been requested by the user through the streaming channel, and analyzing video quality based on encoding information and segmentation information for video content included in the broadcast streaming.

According to still another aspect, performing the monitoring may include receiving the broadcast streaming for which monitoring has been requested by the user through the streaming channel, and recognizing an image or an object based on contents of video content included in the broadcast streaming.

According to still another aspect, performing the monitoring may include receiving the broadcast streaming for which monitoring has been requested by the user through the streaming channel, and analyzing at least one of a pitch, speed, and tone of a voice in audio content included in the broadcast streaming.

According to still another aspect, performing the monitoring may include receiving the broadcast streaming for which monitoring has been requested by the user through the streaming channel, and analyzing feedback for the broadcast streaming based on a specific sentence by using audio content included in the broadcast streaming.

According to still another aspect, providing the monitoring information may include providing the monitoring information through an account capable of participating in the streaming channel.

According to still another aspect, providing the monitoring information may include providing the monitoring information through a separate channel configured by the user.

According to still another aspect, providing the monitoring information may include generating and providing the monitoring information as a separate report, and providing reporting having an interactive form in which results of monitoring is able to be checked for each streaming time zone.

There is provided a computer program stored in a computer-readable recording medium in order to execute the method in a computer device.

In an embodiment, a computer device includes at least one processor configured to execute a computer-readable instructions included in a memory. The at least one processor is configured to register a streaming channel of a user as monitoring target information, perform monitoring on broadcast streaming using the streaming channel based on configuration information of the user, and provide monitoring information for the broadcast streaming.

According to embodiments of the present disclosure, the stable and effective progress of a broadcast can be supported by providing the function for monitoring a streaming state in a broadcast situation and confirming whether a streaming broadcast is received normally.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 5 illustrates an example of a streaming protocol in an embodiment of the present disclosure.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a technology for monitoring broadcast streaming.

Embodiments including contents specifically disclosed in this specification may provide a function for monitoring a streaming state in a broadcast situation and confirming whether a streaming broadcast is received normally.

Figure 1:
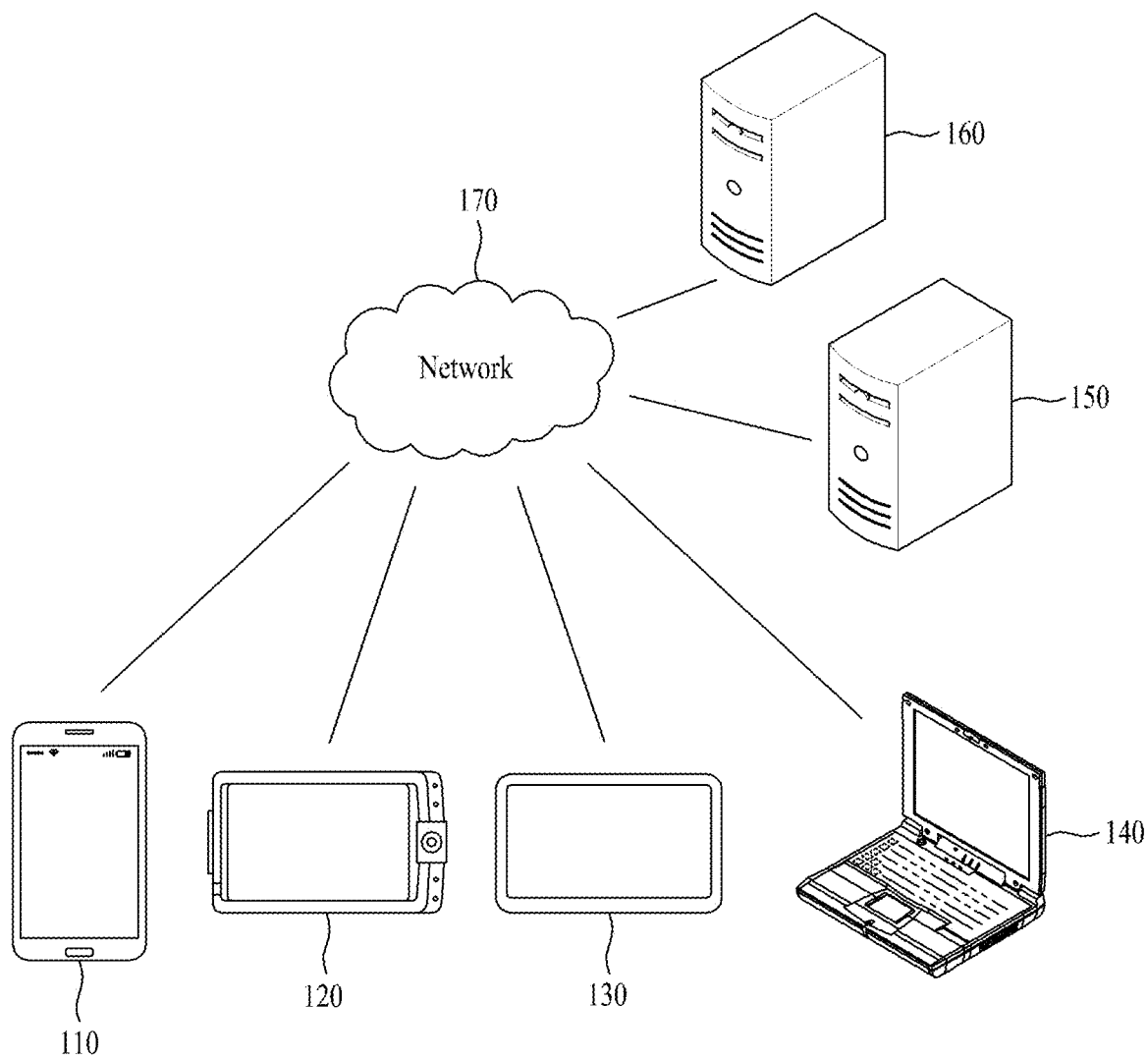
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 connected through the network 170 with a service (e.g., a streaming service).

Figure 2:
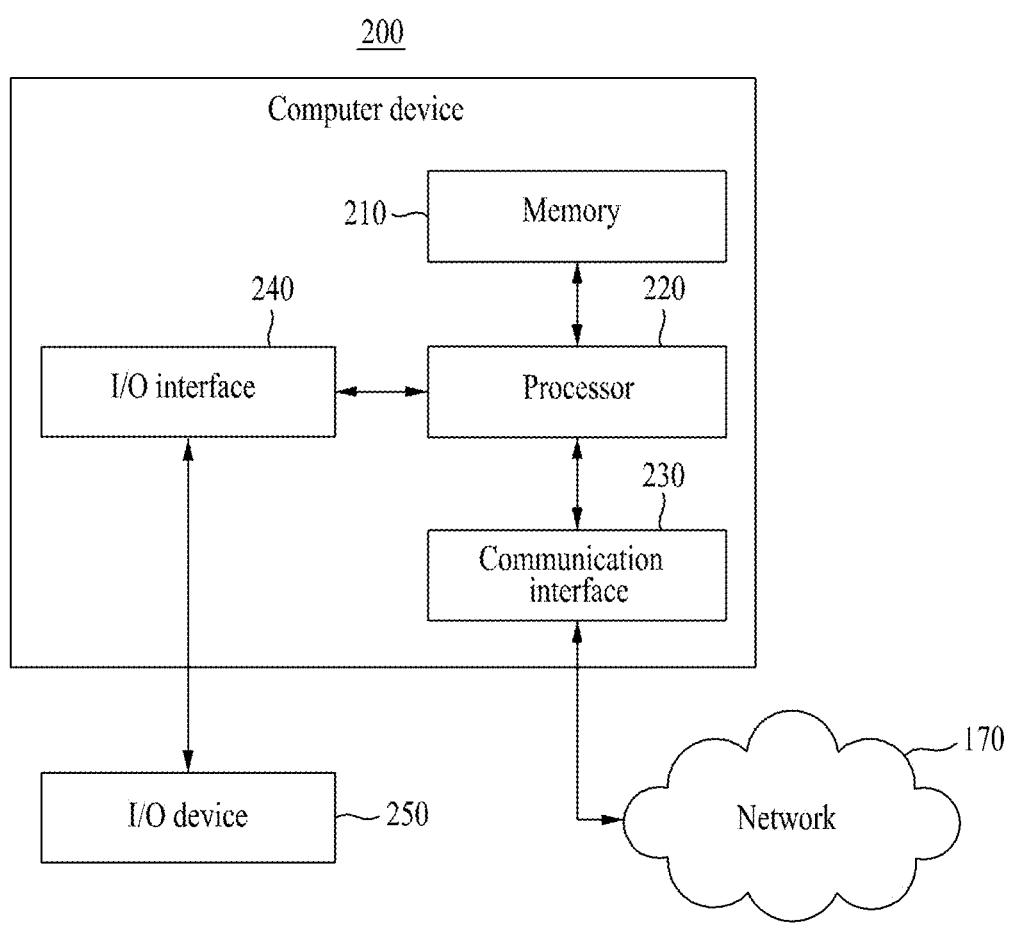
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded onto the memory 210 from a computer-readable recording medium separated from the memory 210. Such a separate computer-readable recording medium may include computer-readable recording media, such as a floppy drive, a disk, a tape, a DVD/CD-ROM drive, and a memory card. In another embodiment, software components may be loaded onto the memory 210 through the communication interface 230 not a computer-readable recording medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. Furthermore, for example, the I/O interface 240 may be means for an interface with a device in which functions for input and output have been integrated into one, such as a touch screen. At least one of the I/O devices 250, together with the computer device 200, may be configured as a single device. For example, the I/O device 250 may be embodied in a form in which a touch screen, a microphone, a speaker, etc. are included in the computer device 200, like a smartphone.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

As a solo broadcast through the Internet is recently greatly increased, it is difficult to confirm whether the transmission of a voice and an image is stably performed along with the sole broadcast when the broadcast is performed. A broadcaster who performs a solo broadcast requests users who participate in the broadcast to check whether the broadcast, such as a microphone voice state, is received normally at the start timing of the broadcast. However, in such a method, every process is inconvenient, an actual broadcast is not smoothly performed, and there is a difficulty during progress.

There is a need for a function for monitoring a streaming state and confirming whether a streaming broadcast is received normally by using a streaming service supplier or a separate service.

Hereinafter, detailed embodiments of a method and system for monitoring streaming are described.

The computer device 200 according to the present embodiment may provide a client with a streaming monitoring service through a dedicated application installed on the client or the access of a web/mobile site related to the computer device 200. A streaming monitoring system embodied as a computer may be configured in the computer device 200. For example, the streaming monitoring system may be embodied in the form of a program that independently operates or may be configured in an in-app form of a specific application and embodied to operate in a specific application.

The processor 220 of the computer device 200 may be embodied as a component for performing the following streaming monitoring method. According to an embodiment, components of the processor 220 may be optionally included in or excluded from the processor 220. Furthermore, according to an embodiment, components of the processor 220 may be separated or merged in order to express a function of the processor 220.

The processor 220 and the components of the processor 220 may control the computer device 200 to perform steps included in the following streaming monitoring method. For example, the processor 220 and the components of the processor 220 may be embodied to execute an instruction according to a code of an operating system and a code of at least one program included in the memory 210.

In this case, the components of the processor 220 may be expressions of different functions performed by the processor 220 based on an instruction provided by a program code that is stored in the computer device 200.

The processor 220 may read a required instruction from the memory 210 onto which an instruction related to control of the computer device 200 has been loaded. In this case, the read instruction may include an instruction for controlling the processor 220 to execute steps to be described later.

Steps included in the streaming monitoring method to be described later may be performed in an order different from an illustrated order, and some of the steps may be omitted or an additional process may be further included.

Figure 3:
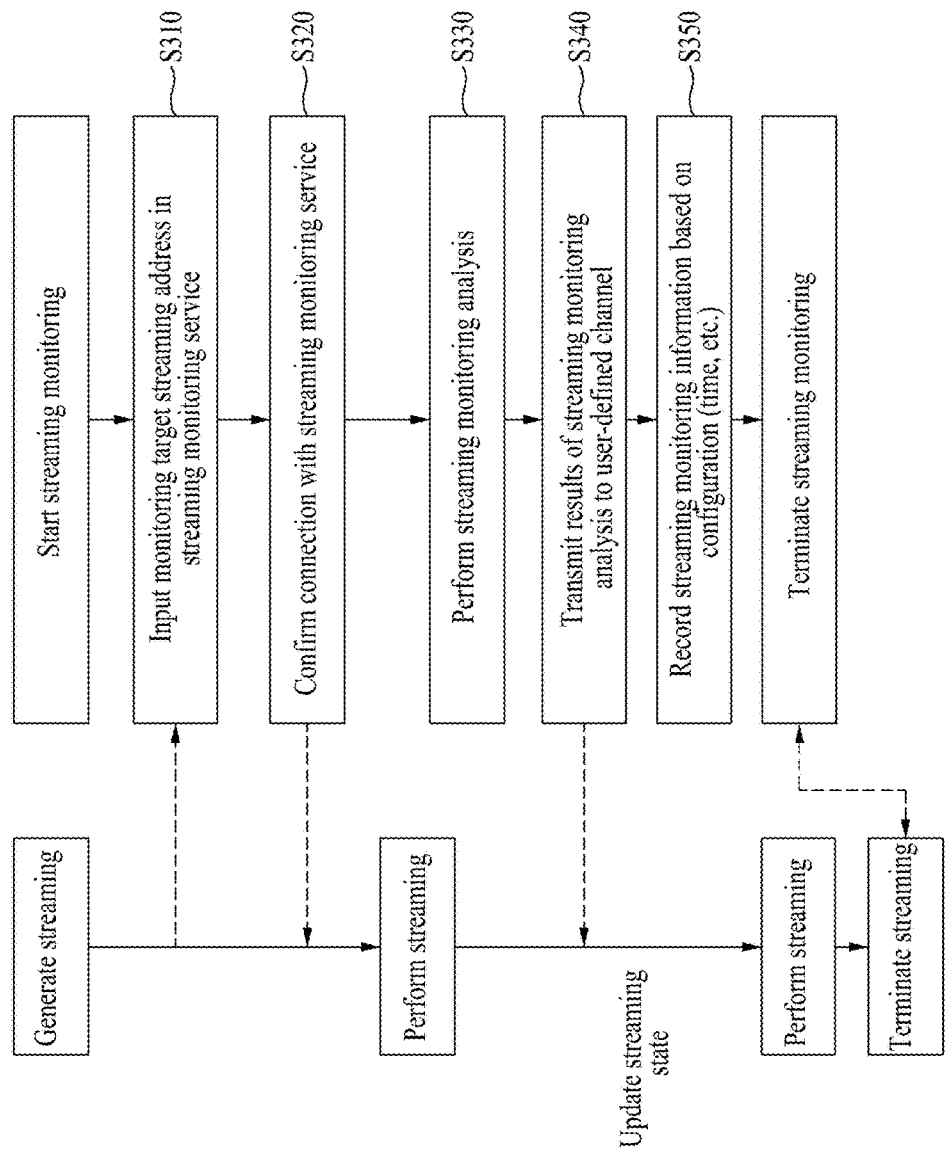
FIG. 3 is a flowchart illustrating an example of a method which may be performed by the computer device according to an embodiment of the present disclosure.

FIG. 3 is a flowchart illustrating an example of a method which may be performed by the computer device according to an embodiment of the present disclosure.

Referring to FIG. 3, in step S310, the processor 220 may receive an input for streaming monitoring target information from a terminal of a broadcaster. The broadcaster may input a monitoring target streaming address in the streaming monitoring service. If a platform provided in the streaming monitoring service is used, the broadcaster may select the corresponding platform and input account information (e.g., a channel address) of the broadcaster. An operator who provides an additional application program interface (API) for separate monitoring may register an API key provided by a platform operator, and may provide monitoring for more specific and various types of information.

In step S320, the processor 220 may confirm a connection with the streaming monitoring service by using the streaming monitoring target information.

In step S330, the processor 220 may perform streaming monitoring analysis on the streaming monitoring target information connected with the streaming monitoring service. The processor 220 may perform monitoring on streaming based on a value set by a user. To this end, user streaming information may be temporarily maintained or may be maintained up to timing at which the deletion of the user streaming information is requested by the user in the monitoring service.

In step S340, the processor 220 may transmit the results of the streaming monitoring analysis to a user-defined channel corresponding to the streaming monitoring target information. The processor 220 may provide an interface in which a broadcaster may check a response according to the streaming monitoring. If a ghost user or an anonymous user can participate in a streaming channel of a user in the streaming service, the processor 220 may transmit the results of the streaming monitoring analysis as a response value by using an anonymous account. If a separate channel designated by a user, for example, an app for a smartphone or a short message service (SMS) is used, the processor 220 may transmit the results of the streaming monitoring analysis to the corresponding channel. If an outdoor broadcast is performed in the form of a solo broadcast, broadcast state information including the results of the streaming monitoring analysis may be provided to a corresponding broadcaster by using a separate channel or a voice. While broadcast streaming is performed, the processor 220 may update a streaming state based on the results of the streaming monitoring analysis.

In step S350, the processor 220 may record streaming monitoring information based on a configuration by the broadcaster. For example, the processor 220 may record the streaming monitoring information by using, as a cycle, the time set by a broadcaster.

Configuration information for the streaming monitoring service is as follows.

1) Streaming service information: this means information of a platform in which broadcast streaming is performed, and corresponds to YouTube, Twitch, and Instagram Live, for example. A function for separately confirming the stability of a connection and a connection prior to a broadcast by using an API based on each of pieces of information is supported.

2) A streaming address: in the case of a pre-registered platform user, a connection may be automatically detected by using channel information.

3) A streaming format: this may include streaming protocol-related information.

4) Streaming access authentication information: this means authentication information for a streaming connection, such as an ID, a password, or a code.

The processor 220 may register monitoring target information, including streaming platform information, a streaming address, a streaming format, or streaming access authentication information.

5) A streaming monitoring method: in the case of video content, a change in the screen or whether a screen is moved may be monitored. In the case of audio content (i.e., a voice), whether a simple voice is received, a method of reading and recognizing a specific sentence, etc. may be monitored.

6) Streaming monitoring cycle and time setting: For example, the results of streaming monitoring analysis may be provided based on a time, such as initial 3 minutes or 5 minutes, after the start of a broadcast. Furthermore, for example, after a specific cycle or random sampling, notification including the results of streaming monitoring analysis may be provided. Furthermore, for example, streaming monitoring history may be provided in a report form.

7) Streaming monitoring area setting: a physical location where streaming monitoring is to be performed may be set. If streaming is globally provided, a function capable of selectively setting a broadcast reception area and monitoring streaming is provided.

8) Monitoring for each streaming bit rate: a bit rate at which streaming is to be monitored, for providing a monitoring function for each streaming bit rate upon streaming monitoring, may be set.

Figure 4:
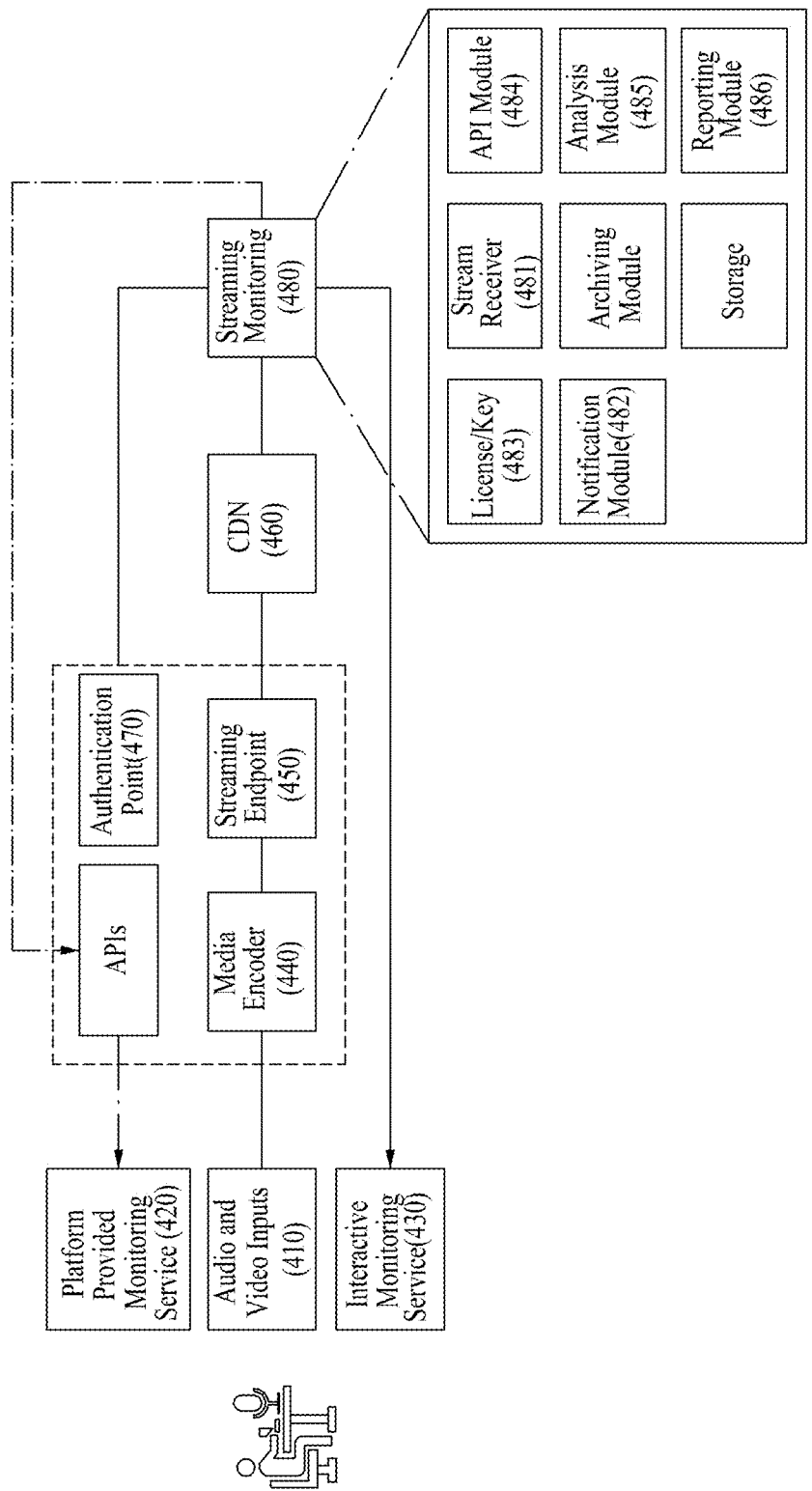
FIG. 4 illustrates architecture of the entire streaming monitoring system in an embodiment of the present disclosure.

FIG. 4 illustrates architecture of the entire streaming monitoring system in an embodiment of the present disclosure.

Referring to FIG. 4, an input unit (audio and video inputs) 410 is responsible for a role that receives (or digitizes) audio and video information generated by a user (or broadcaster) who performs streaming.

A platform-provided monitoring service 420 means that a self-function for separate monitoring is served in a streaming platform used by a user. The platform that provides a separate monitoring service may provide and expand monitoring information through the association of an application program interface (API) with the corresponding platform.

An interactive monitoring service 430 means that the streaming monitoring service provides the results of monitoring through a separate channel or a web/app.

A media encoder 440 is responsible for a role that encodes audio and video information received through the input unit 410.

A streaming endpoint 450 plays a role to transmit broadcast streaming of a user, and may consist of a web server having a distributed form, for example.

In order to effectively provide streaming, a content delivery network (CDN) 460 may be used. In this case, a streaming monitoring module 480 may be connected to an endpoint of the CDN 460.

An authentication point 470 corresponds to a module for an authentication connection if a streaming service provides separate authentication.

The streaming monitoring module 480 provides a function for monitoring broadcast streaming. In this case, in order to provide a monitoring function tailored for an actual streaming service environment, the streaming monitoring module 480 needs to perform monitoring at a location set by a system or a location (e.g., a specific area) requested by a user. Accordingly, the streaming monitoring module 480 may be located at various areas of a cloud operator or may be remotely executed at a location designated by a service supplier.

The streaming monitoring module 480 may provide a monitoring service in a service environment of a platform operator if an API associated with a streaming service platform is present.

The streaming monitoring module 480 may provide a service for streaming monitoring in a software as a service (SaaS) form. A user may use the corresponding service without constructing a separate system.

The streaming monitoring module 480 may include a stream receiver 481, a notification module 482, a license/key module 483, an API module 484, an analysis module 485, a reporting module 486, etc.

The stream receiver 481 plays a role to receive streaming for which monitoring has been requested by a user. In this case, if user authentication is required, the stream receiver 481 may perform authentication for the user in association with the license/key module 483. A related protocol for streaming reception may include RTMP, RTSP, Apple HLS, MPEG-DASH, SRT, WebRTC, etc. as illustrated in FIG. 5.

The notification module 482 provides a communication function for feeding the results of streaming monitoring analysis back to a user based on a user's setting. For example, the notification module 482 may provide notification through a web or an app in real time through an interactive report service. The notification module 482 may also provide notification through an SMS, an e-mail, or push notification (text).

The license/key module 483 may perform an authentication task for a user when the streaming monitoring service requests separate authentication. In this case, authentication information needs to be provided by a monitoring requester. The streaming monitoring service may store and manage the corresponding information in an encrypted form.

The API module 484 may provide a management function for analyzing other information related to the analysis or streaming of the contents of content by using API information provided in streaming. The API module 484 provides a function for connecting information which may be supplied by a platform operator, such as the number of viewers (or hits), a chatting record, or a record of likes, and enabling an analysis platform to receive and confirm the corresponding information. If the API module 484 is connected to a CDN operator, when the CDN operator provides separate information, the API module 484 may receive information including streaming network quality & statics, and may use the information as additional monitoring information. In order to use such functions, a user who has requested monitoring needs to have an API key of a corresponding streaming service platform assigned thereto and to provide corresponding information.

The analysis module 485 may analyze various types of information and states of streaming for which monitoring has been requested by a user.

For example, the analysis module 485 may determine whether streaming having stable quality is provided based on a reception bit rate of streaming as a streaming bit rate check function. The analysis module 485 may determine whether sufficient streaming is performed from a network viewpoint at the request of a desired bit rate in a monitoring environment.

Furthermore, for example, the analysis module 485 may determine the quality of video based on encoding information (e.g., an i/b/p frame) and video segmentation information for streaming content as a function for checking video encoding/segmentation. The analysis module 485 may monitor an interval, omission, etc. of an I-frame, and may monitor a reception state of segmentation information.

Furthermore, for example, the analysis module 485 may analyze the contents of content by providing a video image/object recognition function. When the analysis of the contents of video content is activated, the analysis module 485 may recognize a specific object area of a corresponding video (e.g., recognize the number of simultaneous viewers or a monitoring target object), and may provide the results of the recognition. If an image can be recognized, the analysis module 485 may recognize information, such as a face or expression of a person, and may provide the information as the results of monitoring. The video image and object recognition function may operate based on AI, and may be mounted on the analysis module 485 in an AI model form.

Furthermore, for example, the analysis module 485 may provide a function for checking audio content (sound or voice). The analysis module 485 may analyze a pitch, speed or tone of a voice and provide the pitch, speed or tone as the results of monitoring. The analysis module 485 may extract a user's interested section, a keyword, etc. by analyzing feedback (e.g., the provision of a cost for a super chat or an upload speed of a comment) of streaming based on a specific sentence, and may report the user's interested section, the keyword, etc. The audio content check function may also operate based on AI, and may be mounted on the analysis module 485 in an AI model form.

The reporting module 486 may operate when the generation of broadcast monitoring information is requested as a separate report based on a user's setting. The reporting module 486 may monitor a monitoring target value of a streaming channel of a user based on setting, may store corresponding results, and may provide a service in the form of a web, an app service or a PDF. The reporting module 486 provides a monitoring function in an interactive form by providing time information for checking broadcast monitoring information for each streaming time zone. The reporting module 486 may provide the results of quality monitoring for the entire streaming time with respect to a streaming channel of a user.

Figure 6:
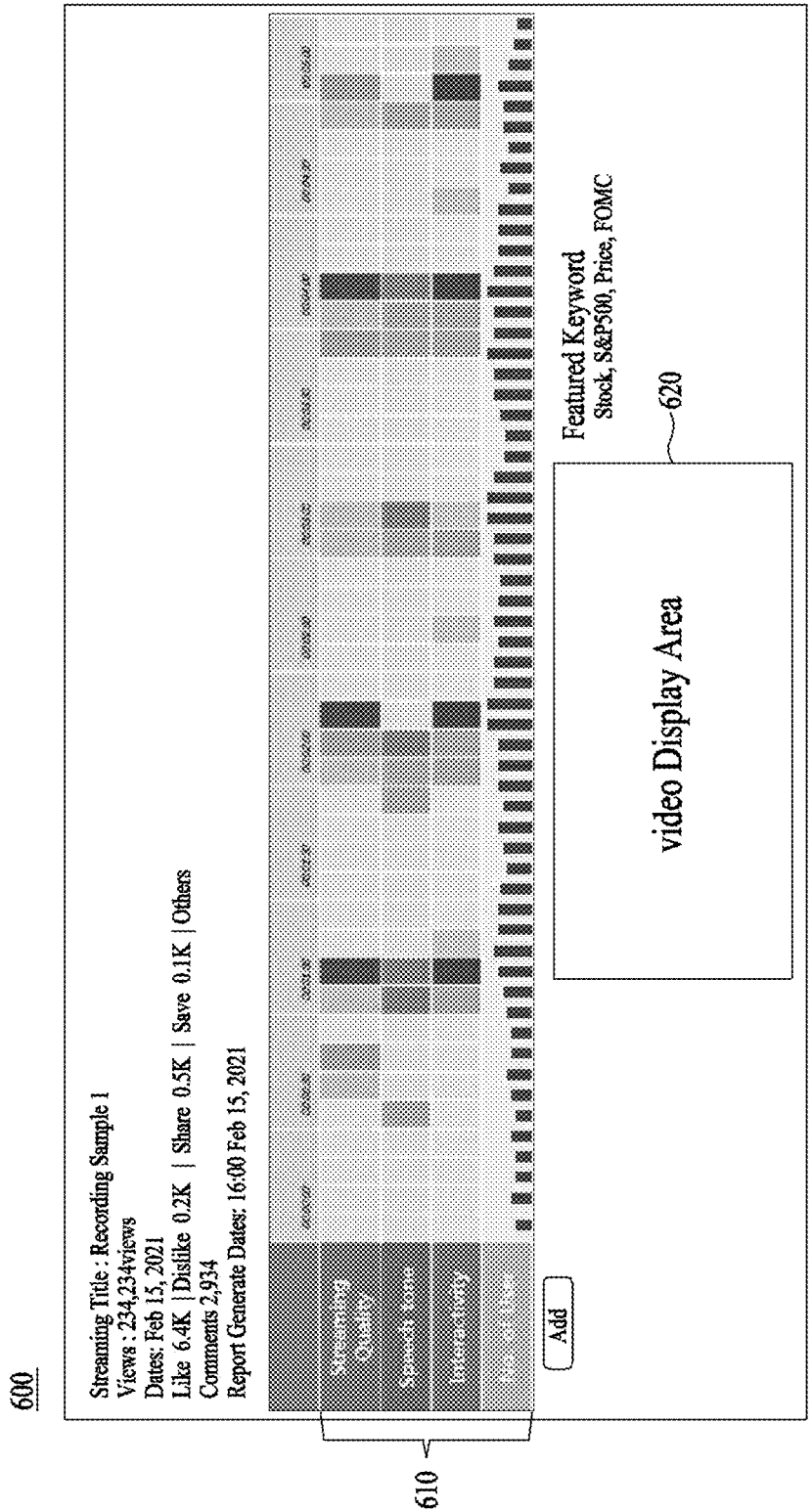
FIG. 6 illustrates an example of an interactive reporting screen in an embodiment of the present disclosure.

FIG. 6 illustrates an example of an interactive reporting screen in an embodiment of the present disclosure.

Referring to FIG. 6, the reporting module 486 may provide an interactive reporting screen 600 including the results of monitoring of at least one analysis item 610 for each time zone in relation to broadcast streaming.

The analysis item 610 may consist of information selected by a corresponding user with respect to a streaming channel of the user.

The interactive reporting screen 600 may include a video display area 620 for displaying video provided through a streaming channel of a user. When a user selects an analysis item in a specific time zone, the interactive reporting screen 600 may associate video content at corresponding timing as the playback of the video display area 620.

Figure 7:
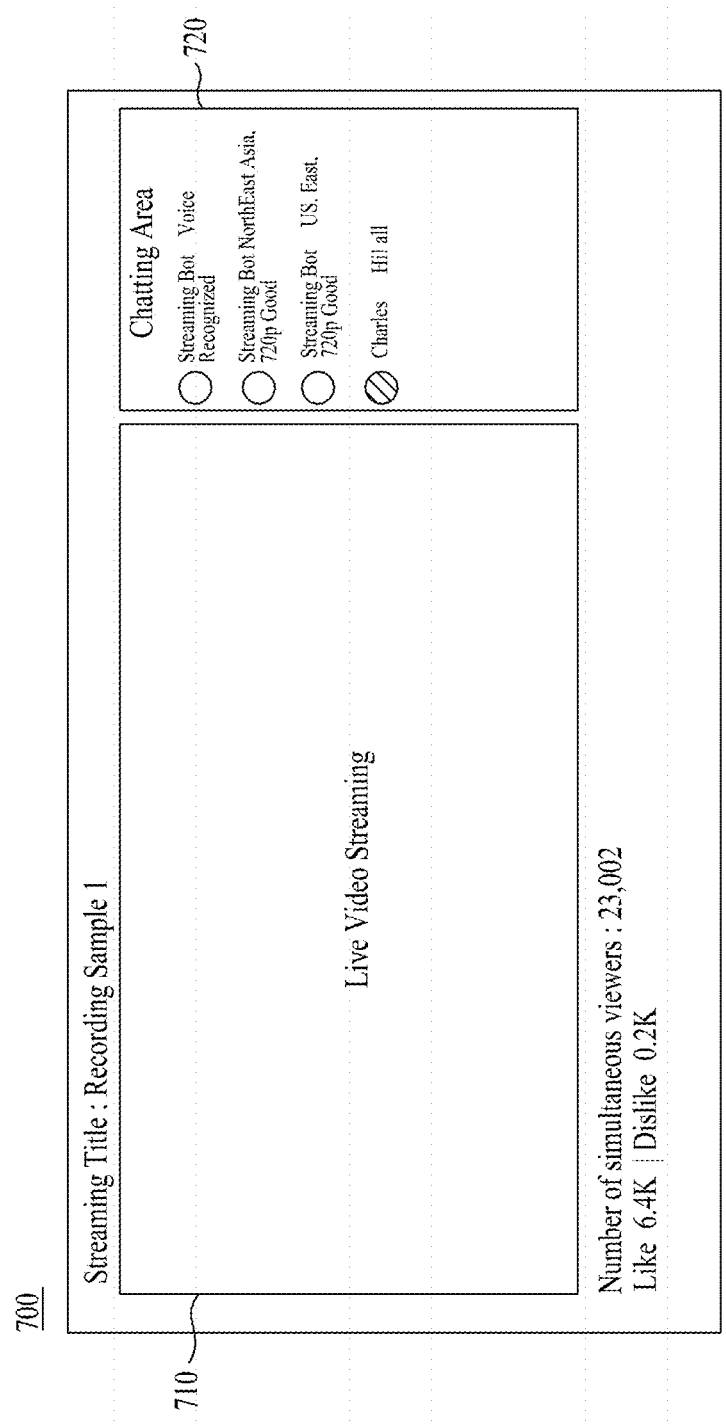
FIG. 7 illustrates an example of a monitoring screen which provides feedback associated with a chatbot API in an embodiment of the present disclosure.

FIG. 7 illustrates an example of a monitoring screen which provides feedback associated with a chatbot API in an embodiment of the present disclosure.

Referring to FIG. 7, the analysis module 485 may provide a monitoring screen 700 for a streaming channel of a user. The monitoring screen 700 may include a video display area 710 for displaying real-time video streaming while a broadcast through a streaming channel of a user is performed, and a chatting area 720 for providing the results of streaming monitoring analysis through a chatbot.

The analysis module 485 may provide the number of simultaneous viewers, viewer feedback (e.g., Like and Dislike) in real time through the monitoring screen 700, and may provide streaming bit rate check results, video encoding and segmentation check results, video image/object recognition results, audio content analysis results, etc. as the results of streaming monitoring analysis.

The analysis module 485 may be composed of an icon area (e.g., a profile image set by a user) related to a user of a streaming channel in the case of a chatbot profile displayed in the chatting area 720.

The analysis module 485 may expose the results of streaming monitoring analysis using the chatbot to a user of a streaming channel, and may determine whether to expose the results of streaming monitoring analysis to a viewer in an access state based on a management configuration according to an embodiment.

As described above, according to embodiments of the present disclosure, when a broadcast through a streaming service is performed, a streaming state can be monitored while the broadcast is performed, and the results of the monitoring can be often provided. Monitoring information for each time zone of the entire streaming time can be provided in a separate report form.

The aforementioned device may be implemented as a hardware component, a software component, or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the disclosure in which an exclusive property or privilege is claimed are defined as follows:

1. A method performed by a computer device, comprising:
   registering, by at least one processor included in the computer device, a streaming channel of a user as monitoring target information;
   performing, by the at least one processor, monitoring of streaming quality on broadcast streaming and content associated with the broadcast streaming using the streaming channel based on configuration information of the user, the performing the monitoring of the content associated with the broadcast streaming including:
      receiving the broadcast streaming for which monitoring has been requested by the user through the streaming channel; and
      recognizing, for video content, an image or an object based on contents of the video content included in the broadcast streaming or analyzing, for audio content, at least one of a pitch, speed, and tone of a voice in audio content included in the broadcast streaming; and
   providing, by the at least one processor, monitoring information for the broadcast streaming, the monitoring information including first analysis information on the monitored streaming quality and second analysis information on the monitored content based on the recognition of the image or the object or the analysis of said at least one of the pitch, speed, and tone of the voice,
   wherein providing the monitoring information comprises:
   generating an interactive report including the monitoring information, and providing the interactive report, and
   the interactive report is configured to provide the monitoring information for each time zone among a plurality of time zones of the broadcast streaming.

2. The method of claim 1, further comprising providing a streaming monitoring service including the registering, the preforming, and the providing in a service environment of a corresponding platform operator through an application program interface (API) operating in conjunction with a platform providing the streaming channel.

3. The method of claim 1, wherein registering the streaming channel of the user comprises registering the monitoring target information comprising streaming platform information, a streaming address, a streaming format, and streaming access authentication information.

4. The method of claim 1, wherein performing the monitoring of the streaming quality further comprises setting at least one of a monitoring cycle, monitoring area, and monitoring bit rate of the broadcast streaming.

5. The method of claim 1, wherein performing the monitoring of the streaming quality further comprises:
   analyzing the streaming quality based on a reception bit rate of the broadcast streaming.

6. The method of claim 1, wherein performing the monitoring of the streaming quality further comprises:
   analyzing video quality based on encoding information and segmentation information for video content included in the broadcast streaming.

7. The method of claim 1, wherein performing the monitoring of the content associated with the broadcast streaming further comprises:
analyzing feedback for the broadcast streaming based on a specific sentence by using audio content included in the broadcast streaming.

8. The method of claim 1, wherein providing the monitoring information comprises providing the monitoring information through a ghost user account or an anonymous user account participating in the streaming channel.

9. The method of claim 1, wherein providing the monitoring information comprises providing the monitoring information through a separate channel including an app for a smartdevice or a short message service (SMS) configured by the user.

10. The method of claim 1, wherein the interactive report includes a display area for displaying the broadcast streaming and the interactive report is configured to display the broadcast streaming for a specific time zone on the display area in response to the monitoring information for the specific time zone being selected among a plurality pieces of the monitoring information for the plurality of time zones.

11. A computer program stored in a computer-readable recording medium in order to execute, in a computer device, the method according to claim 1.

12. A computer device comprising:
at least one processor configured to execute a computer-readable instructions included in a memory,
wherein the at least one processor is configured to:
register a streaming channel of a user as monitoring target information,
perform monitoring of streaming quality on broadcast streaming and content associated with the broadcast streaming using the streaming channel based on configuration information of the user, the monitoring including the at least one processor being configured to:
receive the broadcast streaming for which monitoring has been requested by the user through the streaming channel, and
recognize, for video content, an image or an object based on contents of the video content included in the broadcast streaming or analyzing, for audio content, at least one of a pitch, speed, and tone of a voice in audio content included in the broadcast streaming, and
provide monitoring information for the broadcast streaming, the monitoring information including first analysis information on the monitored streaming quality and second analysis information on the monitored content based on the recognition of the image or the object or the analysis of said at least one of the pitch, speed, and tone of the voice,
wherein the at least one processor is configured to:
generate an interactive report including the monitoring information, and providing the interactive report, and
the interactive report is configured to provide the monitoring information for each time zone among a plurality of time zones of the broadcast streaming.

13. The computer device of claim 12, wherein the at least one processor is configured to:
set at least one of a monitoring cycle, monitoring area, and monitoring bit rate of the broadcast streaming.

14. The computer device of claim 12, wherein the at least one processor is further configured to:
analyze the streaming quality based on a reception bit rate of the broadcast streaming.

15. The computer device of claim 12, wherein the at least one processor is further configured to:
analyze video quality as the streaming quality based on encoding information and segmentation information for video content included in the broadcast streaming, and
analyze feedback for the broadcast streaming as the content associated with the broadcast streaming based on a specific sentence by using audio content included in the broadcast streaming.

16. The computer device of claim 12, wherein the at least one processor is configured to provide the monitoring information through a ghost user account or an anonymous user account participating in the streaming channel or the monitoring information through a separate channel configured by the user.

17. The computer device of claim 12, wherein the interactive report includes a display area for displaying the broadcast streaming and the interactive report is configured to display the broadcast streaming for a specific time zone on the display area in response to the monitoring information for the specific time zone being selected among a plurality pieces of the monitoring information for the plurality of time zones.

* * * * *